United States Patent
Jamadagni et al.

(10) Patent No.: US 9,615,275 B2
(45) Date of Patent: Apr. 4, 2017

(54) METHOD AND APPARATUS FOR COMPUTING LAYER 2 LOAD CONDITIONS IN A WIRELESS NETWORK ENVIRONMENT

(75) Inventors: Satish Nanjunda Swamy Jamadagni, Bangalore (IN); Kyeong-In Jeong, Suwon-si (KR); Gert-Jan Van Lieshout, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 127 days.

(21) Appl. No.: 14/115,533

(22) PCT Filed: May 3, 2012

(86) PCT No.: PCT/KR2012/003494
§ 371 (c)(1),
(2), (4) Date: Dec. 24, 2013

(87) PCT Pub. No.: WO2012/150833
PCT Pub. Date: Nov. 8, 2012

(65) Prior Publication Data
US 2014/0140218 A1    May 22, 2014

(30) Foreign Application Priority Data
May 3, 2011    (IN) .................... 1535/2011

(51) Int. Cl.
H04J 3/16    (2006.01)
H04W 24/08    (2009.01)
(Continued)

(52) U.S. Cl.
CPC ....... *H04W 24/08* (2013.01); *H04W 72/0486* (2013.01); *H04W 24/10* (2013.01);
(Continued)

(58) Field of Classification Search
CPC ..... H04W 24/08; H04W 28/02; H04W 28/00; H04W 40/00; H04W 72/04; H04W 4/00;
(Continued)

(56) References Cited

U.S. PATENT DOCUMENTS 8,467,351 B2 *   6/2013   Liu ................... H04W 36/0094
                                                       370/332
8,693,316 B2 *   4/2014   Palanki et al. ................ 370/225
(Continued)

FOREIGN PATENT DOCUMENTS

EP    2169862 A1    3/2010

*Primary Examiner* — Hanh N Nguyen
(74) *Attorney, Agent, or Firm* — Jefferson IP Law, LLP

(57) ABSTRACT

A method and a system for measuring Layer 2 (L2) load conditions in a wireless network environment are provided. The method of an evolved Node B (eNB) for measuring L2 load conditions in a wireless network environment includes determining total number of Physical Resource Blocks (PRBs) allocated to the eNB in uplink and downlink and determining number of PRBs which are unavailable in uplink and downlink. The method further includes computing number of PRBs available for use during a time period by subtracting the number of unavailable PRBs from the number of allocated PRBs. Moreover, the method includes reporting the number of PRBs available for use during a time period to an Operation And Maintenance (OAM) entity in the wireless network environment.

20 Claims, 4 Drawing Sheets

(51) Int. Cl.
*H04W 72/04* (2009.01)
*H04W 24/10* (2009.01)
*H04W 84/00* (2009.01)
*H04W 84/04* (2009.01)
*H04W 92/10* (2009.01)
*H04W 92/20* (2009.01)

(52) U.S. Cl.
CPC ........ *H04W 84/005* (2013.01); *H04W 84/047* (2013.01); *H04W 92/10* (2013.01); *H04W 92/20* (2013.01)

(58) Field of Classification Search
CPC ..... H04W 24/02; H04W 24/10; H04W 24/00; H04W 48/00; H04W 72/12; H04W 72/0426; H04W 72/0406; H04W 72/044; H04W 72/0493; H04W 92/20; H04W 84/047; H04L 5/0035; H04L 5/0001
USPC .. 370/203–210, 468, 395.21, 329, 225, 338; 455/450, 509
See application file for complete search history.

(56) References Cited

U.S. PATENT DOCUMENTS

| | | | |
|---|---|---|---|
| 8,971,241 B2* | 3/2015 | Palanki | H04B 7/2606 370/328 |
| 2009/0262696 A1 | 10/2009 | Wei et al. | |
| 2010/0278132 A1* | 11/2010 | Palanki et al. | 370/329 |
| 2011/0045819 A1 | 2/2011 | Lee et al. | |
| 2011/0268064 A1* | 11/2011 | Chen et al. | 370/329 |
| 2013/0223258 A1* | 8/2013 | Seo | H04W 24/02 370/252 |

* cited by examiner

METHOD AND APPARATUS FOR COMPUTING LAYER 2 LOAD CONDITIONS IN A WIRELESS NETWORK ENVIRONMENT

CROSS-REFERENCE TO RELATED APPLICATION(S)

This application is a National Stage application under 35 U.S.C. §371 of an International application filed on May 3, 2012 and assigned application No. PCT/KR2012/003494, and claims the benefit under 35 U.S.C. §365(b) of an Indian patent application filed on May 3, 2011 in the Indian Intellectual Property Office and assigned Ser. No. 1535/CHE/2011, the entire disclosure of which is hereby incorporated by reference.

TECHNICAL FIELD

The present disclosure relates to the field of wireless networks. More particularly, the present disclosure relates to performing Layer 2 measurements in a wireless network environment.

BACKGROUND

In the $3^{rd}$ Generation Partnership Project (3GPP), Layer 2 (L2) measurements are generally performed by an evolved Node B (eNB) to facilitate an Operation And Maintenance (OAM) entity and/or to provide neighbor cells with load condition information in a cell. The parameters associated with load conditions include a Physical Resource Block (PRB) usage, a number of received Random Access (RA) preambles, a number of active User Equipments (UEs), a packet delay, data loss, a scheduled Internet Protocol (IP) throughput, and the like. The PRB usage measurements indicate usage of PRBs. A PRB consists of a set of contiguous sub-carriers over a number of Orthogonal Frequency Division Multiplexing (OFDM) symbols.

As discussed above, the PRB usage must be accurately measured and reported to the OAM entity by the eNB as part of the L2 measurement process. Currently, the eNB does not consider non-available physical resources (e.g., Multi-media Broadcast over a Single Frequency Network (MBSFN) resources, Almost Blank Subframes (ABS), and the like) for calculating the PRB usage. This may result in reporting low load percentage to the OAM entity when the eNB is fully loaded for a particular subframe configuration, thereby leading to improper load balancing in the wireless network.

Therefore, a need exists for a method and an apparatus for measuring L2 load conditions in a wireless network environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for measuring Layer 2 (L2) load conditions in a wireless network environment.

In accordance with an aspect of the present disclosure, a method of an evolved Node B (eNB) for measuring L2 load conditions in a wireless network environment is provided. The method includes determining a total number of Physical Resource Blocks (PRBs) allocated to the eNB for uplink transmission, determining a number of PRBs which are unavailable for the uplink transmission, and determining a number of PRBs available for use during a time period by using the number of unavailable PRBs and the number of allocated PRBs.

In accordance with another aspect of the present disclosure, an apparatus is provided. The apparatus includes a processor, and a memory coupled to the processor, wherein the memory includes a measurement module configured to determine a total number of PRBs allocated for uplink transmission, determine a number of PRBs which are unavailable for the uplink transmission, and determine a number of PRBs available for use during a time period by using the number of unavailable PRBs and the number of allocated PRBs.

In accordance with another aspect of the present disclosure, a method of an evolved Node B (eNB) for measuring Layer 2 (L2) load conditions in a wireless network environment is provided. The method includes determining a total number of Physical Resource Blocks (PRBs) used by the eNB for downlink transmission, determining a number of PRBs which are unavailable for the downlink transmission, and determining a number of PRBs available for use during a time period by using the number of unavailable PRBs and the number of allocated PRBs.

In accordance with another aspect of the present disclosure, an apparatus is provided. The apparatus a processor, and a memory coupled to the processor, wherein the memory includes a measurement module configured to determine a total number of Physical Resource Blocks (PRBs) allocated for downlink transmission, determine a number of PRBs which are unavailable for the downlink transmission, and determine a number of PRBs available for use during a time period by using the number of unavailable PRBs and the number of allocated PRBs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
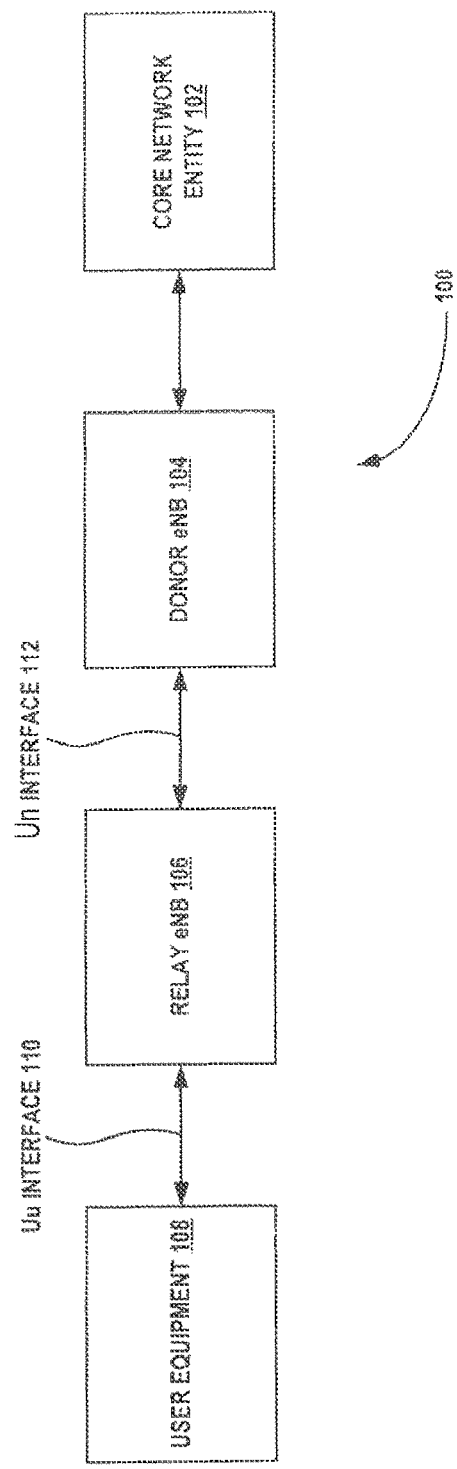
FIG. 1 is a block diagram of a wireless network system according to an embodiment of the present disclosure.

FIG. 1 is a block diagram of a wireless network system according to an embodiment of the present disclosure.

Referring to FIG. 1, a wireless network system 100 includes a core network entity 102, a donor evolved Node B (eNB) 104, a relay eNB 106, and a User Equipment (UE) 108. The wireless network system 100 may be a Long Term Evolution (LTE) network system or an LTE-Advanced (LTE-A) network system. In the system 100, the user equipment 108 is connected to the relay eNB 106 via a Uu interface 110 while the relay eNB 106 is connected to the donor eNB 104 via a Un interface 112.

In one implementation, the relay eNB 106 can be a type 2 relay node. In another implementation, the relay eNB 106 can be a mobile eNB which can be connected to different donor eNBs at different times. In yet another implementation, the relay eNB 106 can be a static eNB in which case the relay eNB 106 is connected to the same donor eNB 104.

Typically, the donor eNB 104 allocates Physical Resource Blocks (PRBs) to relay eNBs and UEs connected to the donor eNB 104. PRBs are a set of contiguous subcarriers (e.g., 12 subcarriers) allocated to an entity (e.g., a relay eNB, a UE, and the like) over a number of Orthogonal Frequency Division Multiplexing (OFDM) symbols for a certain time. The PRBs have both time and frequency dimensions. In order to monitor PRB usage, the donor eNB 104 and/or relay eNB performs PRB usage measurements as part of Layer 2 (L2) measurements. Generally, apart from PRB usage measurement, the L2 measurements also include computing a number of received Random Access (RA) preambles, a number of active UEs, packet delay, data loss, scheduled Internet Protocol (IP) throughput and the like. The L2 measurements assist a network entity, such as an Operation And Maintenance (OAM), and neighbor cells to know the load conditions in the system 100. Total PRB usage measurements and PRB usage measurements for different classes are separately performed by the relay eNB 106 and the donor eNB 104.

According to one embodiment of the present disclosure, the relay eNB 106 computes the number of PRBs available for use during a time period by considering the number of PRBs unavailable in uplink and downlink. In one scenario of the present disclosure, the number of unavailable PRBs is computed based on Multi-media Broadcast over a Single Frequency Network (MBSFN) subframes. For example, the information associated with MBSFN subframes can be obtained from MBSFN subframe configuration. An MBSFN subframe configuration information element is given in APPENDIX 'A'. In the LTE network, the relay eNB 106 determines the unavailable PRBs from the configured MBSFN subframe configuration. On the other hand, in the LTE-A network, the relay eNB 106 determines the unavailable PRBs from the configured MBSFN subframe configuration on which no MBMS service has been provisioned.

In another scenario of the present disclosure, the number of unavailable PRBs is computed based on Almost Blank Subframes (ABSs). ABSs are subframes with reduced transmit power (including no transmission) on some physical channels and/or reduced activity. More specifically, the relay eNB 106 does not consider transmitting on some physical channels due to interference avoidance considerations. Hence, the relay eNB 106 may configure parts or entire ABSs as non-transmitting subframes. Exact PRBs that can be used by the relay eNB 106 from the configured ABSs may depend on various conditions, such as interference consideration at the relay eNB 106. In such case, the relay eNB 106 considers actual number of the PRBs that can be used for user traffic from the configured ABSs while computing the PRBs available for use in the time period.

In yet another scenario of the present disclosure, the relay eNB 106 may not use all subframes in a case of an inband relay where the relay eNB 106 cannot use all uplink/downlink subframes on the Uu interface 110. This is because some of the uplink/downlink subframes are active on the Un interface 112. In such case, the relay eNB 106 considers the number of PRBs that are active on the Un interface 112 while computing the PRBs available for use in the time period. A process for performing PRB usage measurements is illustrated in FIG. 2.

In another embodiment of the present disclosure, the donor eNB 104 computes the number of PRBs available for use during a time period by considering the number of PRBs unavailable in uplink and downlink. The number of unavailable PRBs is computed based on MBSFN subframes and ABSs.

Figure 2:
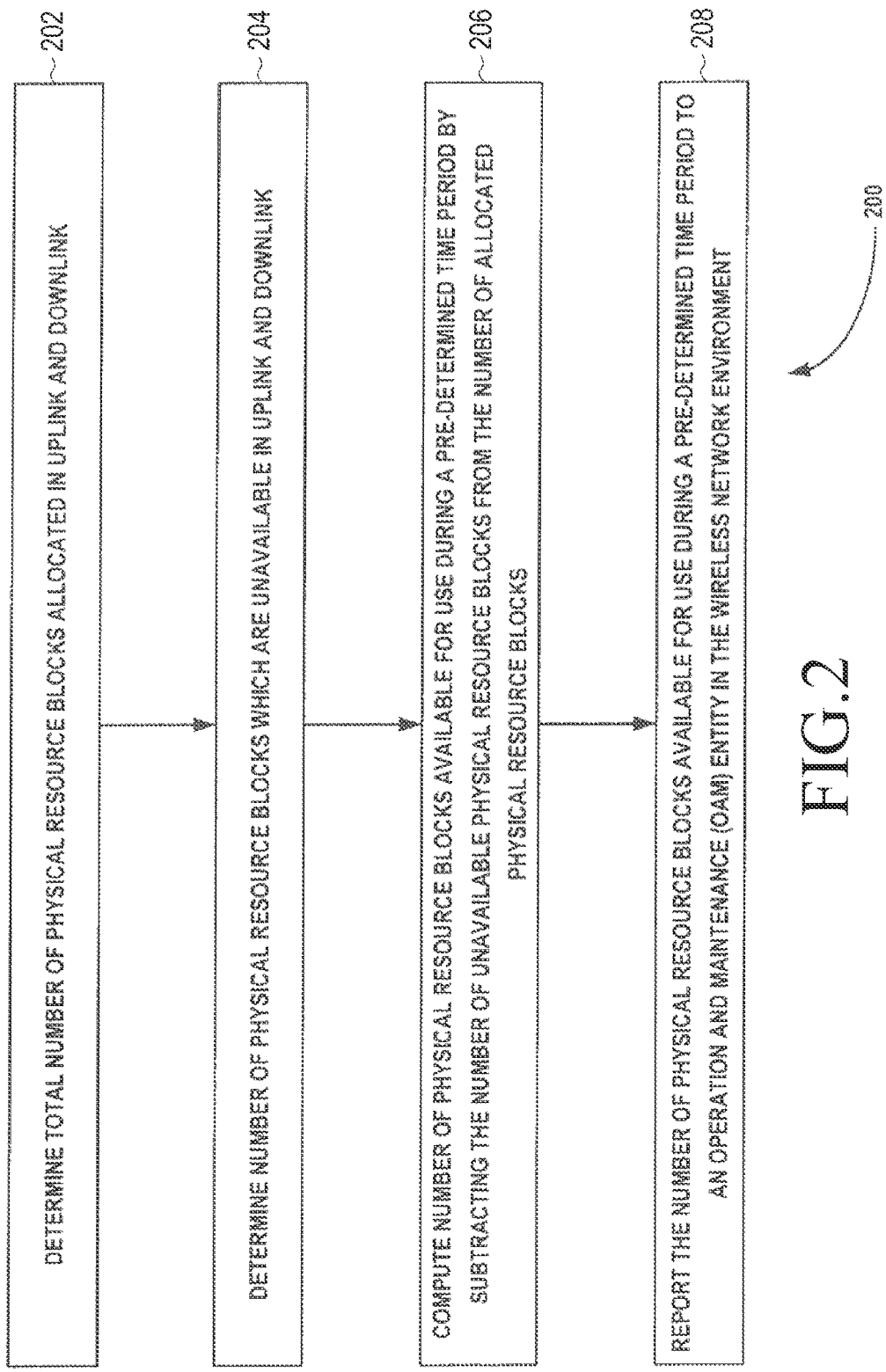
FIG. 2 is a flowchart illustrating a method of measuring Layer 2 (L2) load conditions in a wireless network environment according to an embodiment of the present disclosure.

FIG. 2 is a flowchart illustrating a method of measuring L2 load conditions in a wireless network environment according to an embodiment of the present disclosure.

Referring to FIG. 2, at operation 202 of flowchart 200, the total number of PRBs allocated to the relay eNB 106 in uplink and downlink is determined. At operation 204, the number of PRBs which are unavailable in uplink and downlink are determined.

At operation 206, the number of PRBs available for use during a time period is computed by subtracting the number of unavailable PRBs from the number of allocated PRBs. At operation 208, the number of PRBs available for use during the time period is reported to an OAM entity (not shown in FIG. 1) in the wireless network environment. The OAM entity can be residing in the donor eNB 104. Alternatively, the OAM entity can be a separate entity outside the donor eNB 104.

Although, the operations 202-208 are described with respect to the relay eNB 106, one skilled in the art can envision that the operations 202-208 can be implemented in the donor eNB 104 for performing PRB usage measurements.

Figure 3:
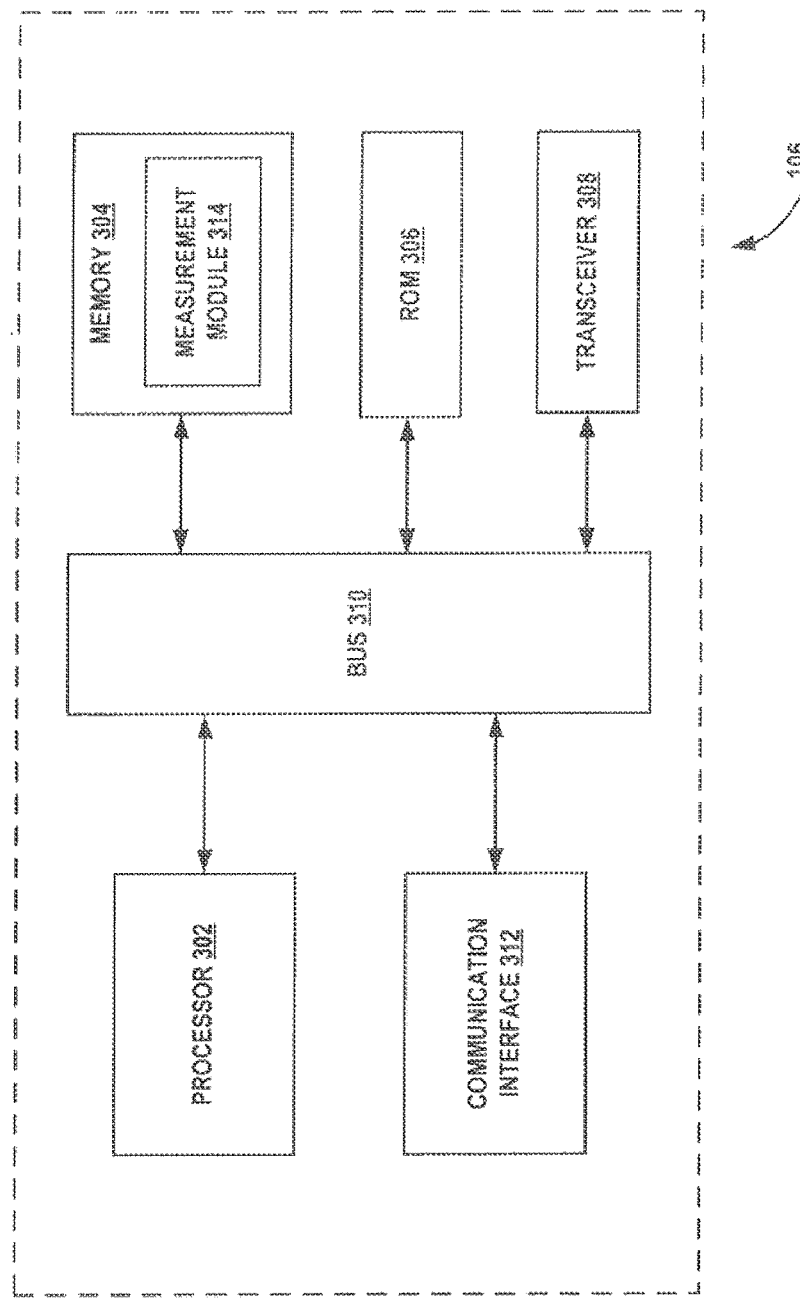
FIG. 3 illustrates a block diagram of a relay evolved Node B (eNB) showing various components according to an embodiment of the present disclosure.

FIG. 3 illustrates a block diagram of a relay eNB showing various components according to an embodiment of the present disclosure.

Referring to FIG. 3, the relay eNB 106 includes a processor 302, a memory 304, a Read Only Memory (ROM) 306, a transceiver 308, a bus 310, and a communication interface 312.

The processor 302, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, and the like.

The memory 304 may be a volatile memory or a non-volatile memory. The memory 304 includes a measurement module 314 for performing L2 measurements (especially PRB usage measurements) according to the various embodiments of the present disclosure. A variety of computer-readable storage media may be stored in and accessed from the memory elements. Memory elements may include any suitable memory device(s) for storing data and machine-readable instructions, such as a ROM, a Random Access Memory (RAM), an erasable programmable ROM, an electrically erasable programmable ROM, a hard drive, a removable media drive for handling memory cards, Memory Sticks™, and the like.

Various embodiments of the present disclosure may be implemented in conjunction with modules, including functions, procedures, data structures, and application programs, for performing tasks, or defining abstract data types or low-level hardware contexts. The measurement module 314 may be stored as machine-readable instructions on any of the above-mentioned storage media for execution by the processor 302. For example, a computer program may include machine-readable instructions capable of performing PRB usage measurements, according to various embodiments of the present disclosure. In one embodiment of the present disclosure, the computer program may be included on a storage medium and loaded from the storage medium to a hard drive in the non-volatile memory.

It is appreciated that since one of ordinary skill in the art is familiar with the components, such as the transceiver 308, the bus 310, and communication interfaces 312, their explanations are thereof omitted.

Figure 4:
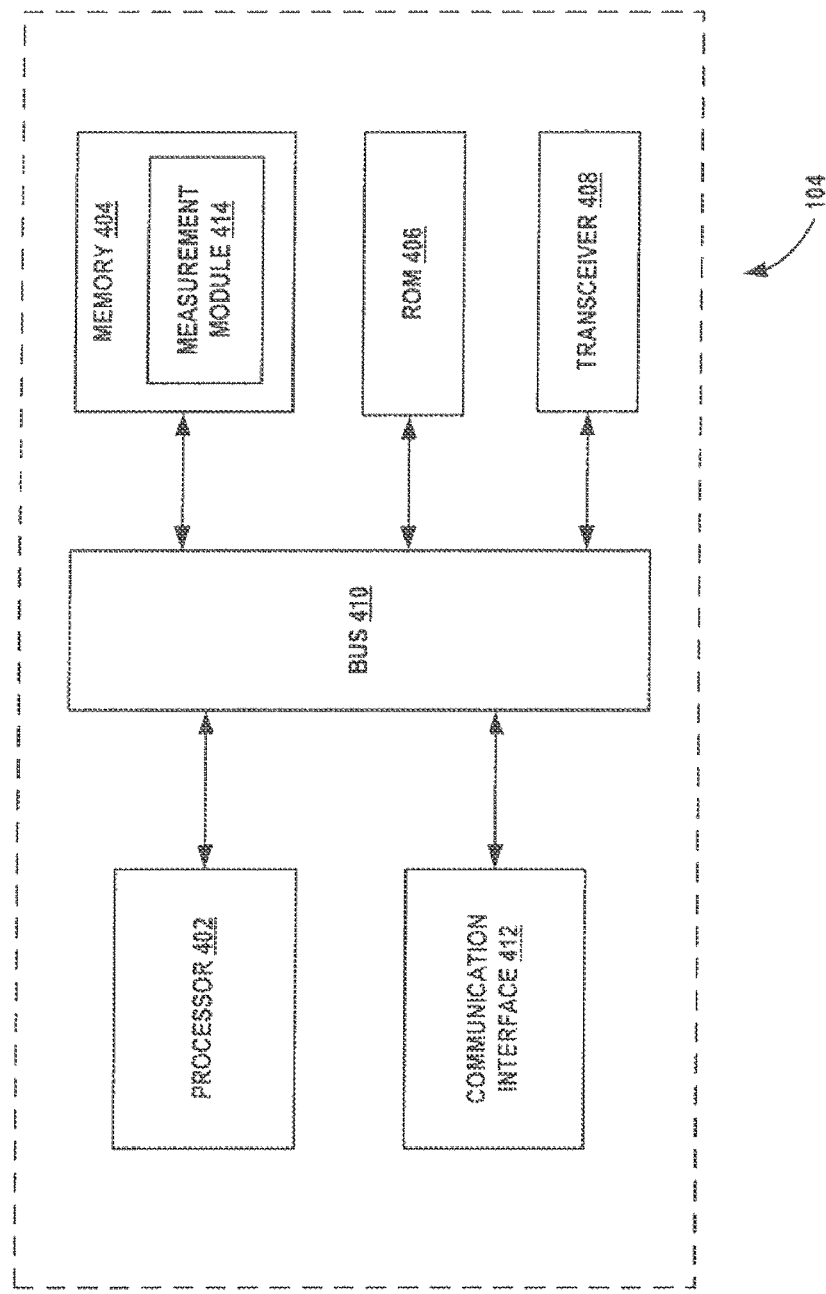
FIG. 4 illustrates a block diagram of a donor eNB showing various components according to an embodiment of the present disclosure.

FIG. 4 illustrates a block diagram of a donor eNB showing various components according to an embodiment of the present disclosure.

Referring to FIG. 4, the donor eNB 104 includes a processor 402, a memory 404, a ROM 406, a transceiver 408, a bus 410, and a communication interface 412.

The processor 402, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, and the like.

The memory 404 may be a volatile memory or a non-volatile memory. The memory 404 includes a measurement module 414 for performing L2 measurements (especially PRB usage measurements) according to the various embodiments of the present disclosure. A variety of computer-readable storage media may be stored in and accessed from the memory elements. Memory elements may include any suitable memory device(s) for storing data and machine-readable instructions, such as a ROM, a RAM, an erasable programmable ROM, an electrically erasable programmable ROM, a hard drive, a removable media drive for handling memory cards, Memory Sticks™, and the like.

Various embodiments of the present disclosure may be implemented in conjunction with modules, including functions, procedures, data structures, and application programs, for performing tasks, or defining abstract data types or low-level hardware contexts. The measurement module 414 may be stored as machine-readable instructions on any of the above-mentioned storage media for execution by the processor 402. For example, a computer program may include machine-readable instructions capable of performing PRB usage measurements, according to various embodiments of the present disclosure. In one embodiment of the present disclosure, the computer program may be included in a storage medium and loaded from the storage medium to a hard drive in the non-volatile memory.

It is appreciated that since one of ordinary skill in the art is familiar with the components, such as the transceiver 408, the bus 410, and communication interfaces 412, their explanations are thereof omitted.

The various devices, modules, selectors, estimators, and the like, described herein may be enabled and operated using hardware circuitry, for example, a complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as an application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of an evolved node b (eNB) for measuring a physical resource block (PRB) usage in a wireless communication system, the method comprising:
   identifying, at the eNB, a number of physical resource blocks (PRBs) allocated for uplink transmission during a time period;
   determining, at the eNB, a total number of PRBs available for use during the time period based on a number of unavailable PRBs for the uplink transmission during the time period; and
   determining, at the eNB, the PRB usage during the time period based on the number of allocated PRBs and the total number of PRBs available for use, wherein the unavailable PRBs comprise PRBs for multimedia broadcast over a single frequency network (MBSFN) subframes.

2. The method of claim 1, further comprising:
transmitting information related to the total number of PRBs available for use to an operation and maintenance (OAM) entity.

3. The method of claim 1, wherein the total number of PRBs available for use is calculated by subtracting the number of unavailable PRBs from the number of allocated PRBs.

4. The method of claim 1, wherein the PRB usage is calculated in a time-frequency domain.

5. The method of claim 1, wherein the unavailable PRBs further comprise PRBs for subframes considering interference avoidance.

6. An evolved node b (eNB) for measuring a physical resource block (PRB) usage in a wireless communication system, the eNB comprising:
a processor; and
a memory coupled to the processor,
wherein the memory comprises a measurement module configured to:
identify a number of physical resource blocks (PRBs) allocated for uplink transmission during a time period,
determine a total number of PRBs available for use during the time period based on a number of unavailable PRBs for uplink transmission during the time period, and
determine the PRB usage during the time period based on the number of allocated PRBs and the total number of PRBs available for use, and
wherein the unavailable PRBs comprise PRBs for multimedia broadcast over a single frequency network (MBSFN) subframes.

7. The eNB of claim 6, wherein the measurement module is configured to transmit information related to the total number of PRBs available for use to an operation and maintenance (OAM) entity.

8. The eNB of claim 6, wherein measurement module calculates the total number of PRBs available for use by subtracting the number of unavailable PRBs from the number of allocated PRBs.

9. The eNB of claim 6, wherein the PRB usage is calculated in a time-frequency domain.

10. The eNB of claim 6, wherein the unavailable PRBs further comprise PRBs for subframes considering interference avoidance.

11. A method of an evolved node b (eNB) for measuring a physical resource block (PRB) usage in a wireless communication system, the method comprising:
identifying, at the eNB, a number of physical resource blocks (PRBs) used for downlink transmission during a time period;
determining, at the eNB, a total number of PRBs available for use during the time period based on a number of unavailable PRBs for the downlink transmission during the time period; and
determining, at the eNB, the PRB usage during the time period based on the number of used PRBs and the total number of PRBs available for use,
wherein the unavailable PRBs comprise PRBs for multimedia broadcast over a single frequency network (MBSFN) subframes.

12. The method of claim 11, further comprising:
transmitting information related to the total number of PRBs available for use to an operation and maintenance (OAM) entity.

13. The method of claim 11, wherein the total number of PRBs available for use is calculated by subtracting the number of unavailable PRBs from the number of used PRBs.

14. The method of claim 11, wherein the PRB usage is calculated in a time-frequency domain.

15. The method of claim 11, wherein the unavailable PRBs further comprise PRBs for subframes considering interference avoidance.

16. An evolved node b (eNB) for measuring a physical resource block (PRB) usage in a wireless communication system, the eNB comprising:
a processor; and
a memory coupled to the processor,
wherein the memory includes a measurement module configured to:
identify a number of physical resource blocks (PRBs) used for downlink transmission during a time period,
determine a total number of PRBs available for use during the time period based on a number of unavailable PRBs for the downlink transmission during the time period, and
determine the PRB usage during the time period based on the number of used PRBs and the total number of PRBs available for use,
wherein the unavailable PRBs comprise PRBs for multimedia broadcast over a single frequency network (MBSFN) subframes.

17. The eNB of claim 16 wherein the measurement module is configured to transmit information related to the total number of PRBs available for use to an operation and maintenance (OAM) entity.

18. The eNB of claim 16, wherein the measurement module calculates the total number of PRBs available for use by subtracting the number of unavailable PRBs from the number of used PRBs.

19. The eNB of claim 16, wherein the PRB usage is calculated in a time-frequency domain.

20. The eNB of claim 16, wherein the unavailable PRBs further comprise PRBs for subframes considering interference avoidance.

* * * * *